US011321676B2

(12) United States Patent
Bender et al.

(10) Patent No.: US 11,321,676 B2
(45) Date of Patent: *May 3, 2022

(54) AUTOMATICALLY RESCHEDULING OVERLAPPING FLEXIBLE MEETING EVENTS IN AN ELECTRONIC CALENDAR

(71) Applicant: INTERNATIONAL BUSINESS MACHINES CORPORATION, Armonk, NY (US)

(72) Inventors: Michael Bender, Rye Brook, NY (US); Gordan G. Greenlee, Endicott, NY (US); Michael P. Shute, Niantic, CT (US); Siddhartha Sood, Ghaziabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/693,951

(22) Filed: Nov. 25, 2019

(65) Prior Publication Data

US 2020/0090134 A1 Mar. 19, 2020

Related U.S. Application Data

(63) Continuation of application No. 15/453,075, filed on Mar. 8, 2017, now Pat. No. 10,565,564.

(51) Int. Cl.
*G06Q 10/10* (2012.01)
*G06F 3/0482* (2013.01)

(52) U.S. Cl.
CPC ....... *G06Q 10/1095* (2013.01); *G06F 3/0482* (2013.01)

(58) Field of Classification Search
CPC .......... G06Q 10/109; G06Q 10/06311; G06Q 10/1093; G06Q 10/1095
See application file for complete search history.

(56) References Cited

U.S. PATENT DOCUMENTS 5,270,920 A 12/1993 Pearse
5,572,728 A 11/1996 Tada
(Continued)

FOREIGN PATENT DOCUMENTS

WO 2016081325 A1 5/2016

OTHER PUBLICATIONS

Padwick et al., Special Edition Using Microsoft Outlook 2000 Que, May 12, 1999 (Year: 1999).*

(Continued)

*Primary Examiner* — Scott L Jarrett
(74) *Attorney, Agent, or Firm* — Brian Restauro; Andrew D. Wright; Roberts Calderon Safran & Cole, P.C.

(57) ABSTRACT

Systems and methods for managing flexible events in an electronic calendar are disclosed. In embodiments, a computer-implemented method comprises: determining, by a computing device, that an electronic calendar event is a flexible event based on recording data of the electronic calendar event indicating that a recording of the electronic calendar event may be available; determining, by the computing device, an end date by which the electronic calendar event must be completed based on the scheduling data; and displaying, by the computing device, an electronic calendar with the electronic calendar event to a user.

19 Claims, 5 Drawing Sheets

(56) References Cited

U.S. PATENT DOCUMENTS

| | | | |
|---|---|---|---|
| 5,692,125 A * | 11/1997 | Schloss | G06Q 10/06 705/7.16 |
| 5,727,950 A | 3/1998 | Cook | |
| 5,899,979 A | 5/1999 | Miller | |
| 6,047,260 A | 4/2000 | Levinson | |
| 6,119,147 A | 9/2000 | Toomey | |
| 6,438,353 B1 | 8/2002 | Casey-Cholakis | |
| 6,487,585 B1 | 11/2002 | Yurkovic | |
| 6,661,877 B1 | 12/2003 | Lee | |
| 7,512,454 B1 * | 3/2009 | Li | G06Q 50/04 700/97 |
| 7,703,048 B2 | 4/2010 | Alford, Jr. | |
| 8,060,567 B2 | 11/2011 | Carroll | |
| 8,180,662 B2 | 5/2012 | Minert | |
| 8,180,663 B2 * | 5/2012 | Tischhauser | G06Q 10/1095 705/7.19 |
| 8,535,059 B1 | 9/2013 | Noble, Jr. | |
| 8,560,371 B2 | 10/2013 | Levitt | |
| 8,681,808 B1 * | 3/2014 | Tessier | G06Q 10/1093 370/431 |
| 8,743,171 B2 | 6/2014 | Hiller | |
| 8,843,558 B2 | 9/2014 | Murphy, Jr. | |
| 9,053,500 B2 | 6/2015 | Etesse | |
| 9,152,953 B2 | 10/2015 | Lai | |
| 9,253,330 B2 | 2/2016 | Boss et al. | |
| 9,348,897 B2 * | 5/2016 | Shoham | G06F 16/335 |
| 9,559,847 B2 | 1/2017 | Hurst | |
| 9,626,659 B2 * | 4/2017 | Bathiya | G06Q 10/1095 |
| 9,660,824 B2 | 5/2017 | Shi | |
| 9,679,274 B1 | 6/2017 | Roth | |
| 9,680,775 B2 | 6/2017 | Sirota | |
| 10,027,796 B1 * | 7/2018 | Almog | G06F 16/907 |
| 10,062,057 B2 * | 8/2018 | Kitada | H04N 21/43072 |
| 10,074,078 B2 | 9/2018 | Siegel | |
| 10,102,198 B2 | 10/2018 | Astigarraga | |
| 10,241,654 B2 * | 3/2019 | Meyer | G06F 3/04842 |
| 10,565,564 B2 * | 2/2020 | Bender | G06Q 10/1095 |
| 2001/0049617 A1 | 12/2001 | Berenson | |
| 2002/0059373 A1 | 5/2002 | Boys | |
| 2002/0188607 A1 | 12/2002 | Kogut-O'Connell | |
| 2003/0120516 A1 | 6/2003 | Perednia | |
| 2003/0149606 A1 | 8/2003 | Cragun | |
| 2003/0152904 A1 | 8/2003 | Doty | |
| 2003/0169330 A1 | 9/2003 | Ben-Shachar | |
| 2003/0204474 A1 * | 10/2003 | Capek | G06Q 20/382 705/64 |
| 2005/0065832 A1 | 3/2005 | Virta | |
| 2005/0076037 A1 * | 4/2005 | Shen | G06Q 10/107 |
| 2005/0165631 A1 | 7/2005 | Horvitz | |
| 2005/0256754 A1 | 11/2005 | Nastacio | |
| 2005/0278632 A1 | 12/2005 | McKethan, Jr. | |
| 2006/0010023 A1 | 1/2006 | Tromczynski | |
| 2006/0271399 A1 | 11/2006 | Robson, Sr. | |
| 2007/0112926 A1 | 5/2007 | Brett | |
| 2007/0300163 A1 * | 12/2007 | Alford | G06Q 10/109 715/751 |
| 2008/0028317 A1 | 1/2008 | Castelli | |
| 2008/0037721 A1 | 2/2008 | Yao | |
| 2008/0040187 A1 | 2/2008 | Carraher | |
| 2008/0046437 A1 | 2/2008 | Wood | |
| 2008/0059265 A1 * | 3/2008 | Biazetti | G06Q 10/109 705/7.19 |
| 2008/0059618 A1 | 3/2008 | May | |
| 2008/0141247 A1 | 6/2008 | Saravanan | |
| 2008/0168113 A1 * | 7/2008 | Hickling | G06Q 10/109 708/112 |
| 2008/0175104 A1 | 7/2008 | Grieb | |
| 2008/0198979 A1 | 8/2008 | Skakkebaek | |
| 2008/0243582 A1 * | 10/2008 | Chen | G06Q 10/109 705/7.19 |
| 2008/0307323 A1 | 12/2008 | Coffman | |
| 2009/0006410 A1 | 1/2009 | Choi | |
| 2009/0132329 A1 | 5/2009 | Lam | |
| 2009/0165022 A1 | 6/2009 | Madsen | |
| 2009/0292625 A1 | 11/2009 | King | |
| 2010/0088143 A1 | 4/2010 | Platt | |
| 2010/0153160 A1 | 6/2010 | Bezemer | |
| 2010/0211424 A1 * | 8/2010 | Hill | G06Q 10/1095 705/7.18 |
| 2012/0150956 A1 | 6/2012 | Tucker | |
| 2012/0203551 A1 | 8/2012 | Lakshmanan | |
| 2012/0209860 A1 * | 8/2012 | Gummagatta | G06Q 10/109 707/748 |
| 2012/0239451 A1 | 9/2012 | Caligor | |
| 2013/0063542 A1 | 3/2013 | Bhat | |
| 2013/0073329 A1 | 3/2013 | Shoham | |
| 2013/0282421 A1 | 10/2013 | Graff | |
| 2013/0325972 A1 * | 12/2013 | Boston | G06K 9/00751 709/206 |
| 2014/0006082 A1 * | 1/2014 | Harms | G06Q 10/1095 705/7.19 |
| 2014/0200940 A1 * | 7/2014 | Putterman | G06Q 10/1095 705/7.16 |
| 2014/0379407 A1 * | 12/2014 | Horton | G06Q 10/1095 705/7.19 |
| 2015/0127403 A1 * | 5/2015 | Petty | G06F 3/0481 705/7.18 |
| 2015/0142895 A1 | 5/2015 | Beran | |
| 2015/0199653 A1 * | 7/2015 | Cili | G06Q 10/1095 705/7.19 |
| 2015/0200786 A1 | 7/2015 | Stott | |
| 2015/0227879 A1 | 8/2015 | Bertanzetti | |
| 2015/0254518 A1 * | 9/2015 | Griffin | G06F 40/166 382/229 |
| 2015/0324754 A1 | 11/2015 | Bathiya | |
| 2016/0027442 A1 | 1/2016 | Burton | |
| 2016/0217432 A1 * | 7/2016 | Yavor | G06Q 10/1095 |
| 2016/0267439 A1 | 9/2016 | Bitran | |
| 2016/0292651 A1 | 10/2016 | Bathiya | |
| 2016/0335572 A1 | 11/2016 | Bennett | |
| 2016/0344673 A1 | 11/2016 | Abou Mahmoud | |
| 2016/0350720 A1 * | 12/2016 | Moorjani | G06Q 10/1095 |
| 2017/0059337 A1 | 3/2017 | Barker | |
| 2017/0199866 A1 | 7/2017 | Gunaratna et al. | |
| 2017/0249596 A1 | 8/2017 | Weir | |
| 2017/0286853 A1 | 10/2017 | Liensberger | |
| 2017/0358305 A1 | 12/2017 | Kudurshian | |
| 2018/0039478 A1 * | 2/2018 | Sung | G06F 3/167 |
| 2018/0091459 A1 | 3/2018 | Bastide | |
| 2018/0101761 A1 | 4/2018 | Nelson | |
| 2018/0191907 A1 | 7/2018 | Herrin | |
| 2018/0234545 A1 | 8/2018 | Barak | |
| 2018/0260785 A1 | 9/2018 | Bender | |
| 2021/0027253 A1 * | 1/2021 | Gray | G06Q 10/1095 |

OTHER PUBLICATIONS

Buseman, Stephan et al., Natural Language Dialogue Service for Appointment Scheduling Agents ANLC '97 Proceedings of the fifth conference on Applied natural language processing, 1997 (Year: 1997), 8 pages.

Maddix, Nicholas, A Comparison of Text Importing Tools for Users of Palm Compatible PDAs Textual, 2001 (Year: 2001), 11 pages.

Refanidis, Ioannis et al., On Scheduling Events and Tasks by an Intelligent Calendar Assistant Association for the Advancement of Artificial Intelligence, 2009 (Year: 2009), 10 pages.

List of IBM Patents or Patent Applications Treated as Related, dated Nov. 25, 2019, 1 page.

* cited by examiner

AUTOMATICALLY RESCHEDULING OVERLAPPING FLEXIBLE MEETING EVENTS IN AN ELECTRONIC CALENDAR

BACKGROUND

The present invention relates generally to electronic calendars and, more particularly, to managing flexible events in an electronic calendar.

Various electronic calendaring systems have been developed that enable users to make changes to an electronic schedule. Some electronic calendaring systems enable multiple users to access one another's electronic calendar to coordinate the scheduling of electronic calendar events.

SUMMARY

In an aspect of the invention, a computer-implemented method includes: determining, by a computing device, that an electronic calendar event is a flexible event based on recording data of the electronic calendar event indicating that a recording of the electronic calendar event may be available; determining, by the computing device, an end date by which the electronic calendar event must be completed based on the scheduling data; and displaying, by the computing device, an electronic calendar with the electronic calendar event to a user.

In another aspect of the invention, there is a computer program product for managing flexible events in an electronic calendar. The computer program product comprises a computer readable storage medium having program instructions embodied therewith. The program instructions are executable by a computing device to cause the computing device to: receive scheduling data for an electronic calendar event, the scheduling data including recording data indicating that a recording of the electronic calendar event may be available; determine that the electronic calendar event is a flexible event based on the recording data; determine an end date by which the electronic calendar event must be completed based on the scheduling data; and displaying an electronic calendar with the electronic calendar event and indicia indicating that the electronic calendar event is a flexible event.

In another aspect of the invention, there is a system for managing flexible events in an electronic calendar. The system includes a CPU, a computer readable memory and a computer readable storage medium associated with a computing device. The system further includes program instructions to receive scheduling data for an electronic calendar event from a remote computing device, the scheduling data including recording data indicating that a recording of the electronic calendar event may be available; program instructions to determine that the electronic calendar event is a flexible event based on the recording data; program instructions to determine an end date by which the electronic calendar event must be completed based on the scheduling data; program instructions to updating the electronic calendar with the electronic calendar event, wherein the electronic calendar event includes indicia indicating that the electronic calendar event is a flexible event; and program instructions to display the electronic calendar event to a user as a flexible event, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
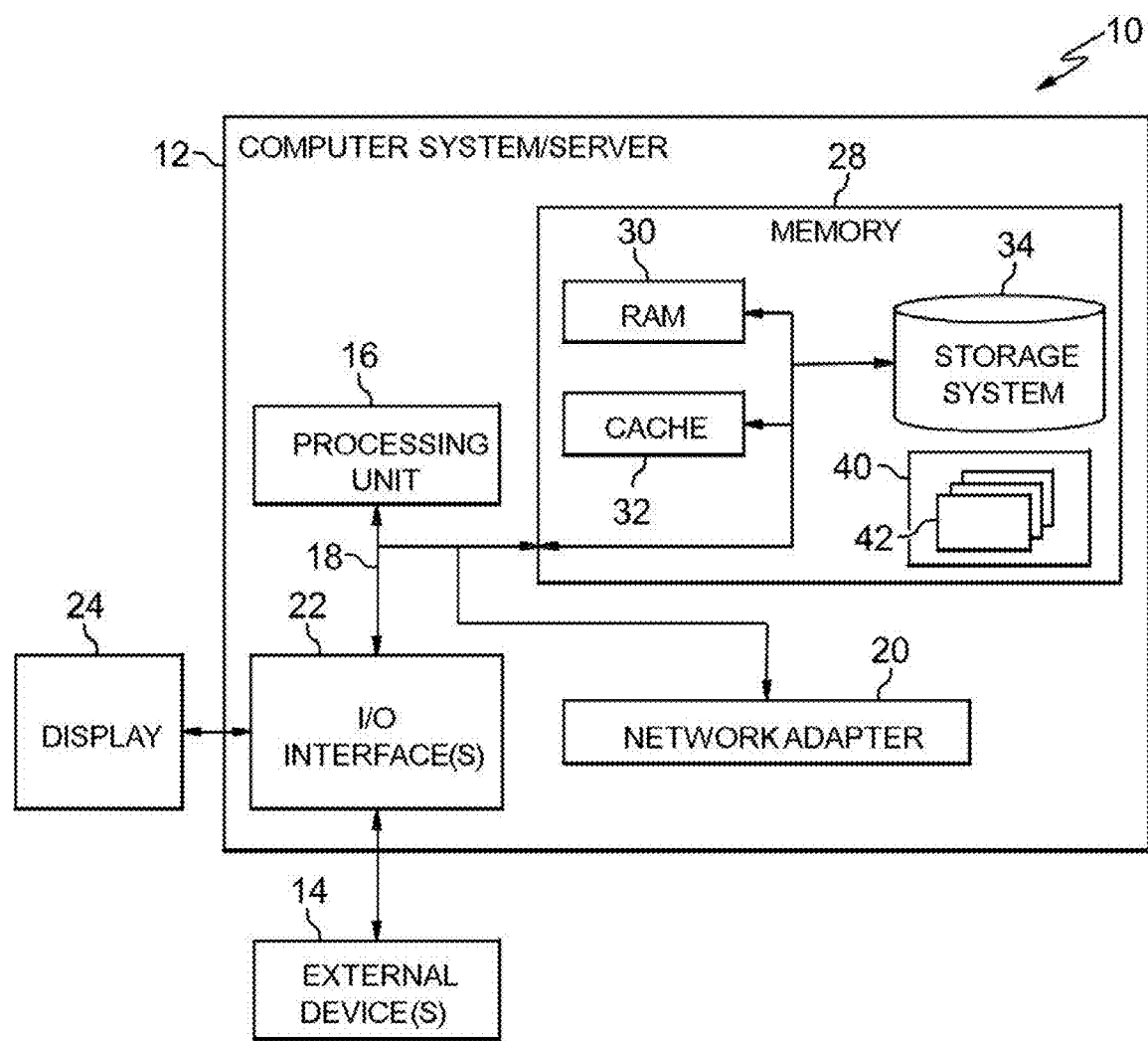
FIG. 1 depicts a computing infrastructure according to an embodiment of the present invention.

The present invention relates generally to electronic calendars and, more particularly, to managing flexible events in an electronic calendar. In embodiments, a system provides for automatically managing rescheduling of calendar events that have been deemed "flexible" to enable the scheduling of less flexible events in their place. A "flexible" calendar event may be one that meets one or more of the following criteria: the event is deemed flexible when it is scheduled; the event is tagged as flexible when it is accepted into a user's electronic calendar; the event is detected to be flexible based on keywords that are entered into a user's profile/setting; or the event has a recording that can be replayed later, where the user is prompted to check if the event should be designated as flexible. In aspects, a host of an event is able to view multiple electronic calendars of respective users, and is able to distinguish flexible events from non-flexible events based on a visual indicator. In embodiments, when a new calendar event is accepted by a user of an electronic calendar, but the new event overlaps with a previously scheduled flexible calendar event, a system of the invention automatically reschedules the flexible calendar event for a time period that is open (available) on the user's electronic calendar. In aspects, by enabling users to visually distinguish flexible calendar events from non-flexible calendar events, the system provides more opportunities for scheduling calendar events in a manner that is acceptable for all event participants. In embodiments, flexible calendar events are only designated as "flexible" for a predetermined period of time, after which the system automatically adjusts the designation of the calendar event to a non-flexible calendar event.

When calendaring lower priority meetings or events, such as education events in the form of seminars, webinars, or the like, there may arise a conflict with higher priority meetings or tasks. Embodiments of the invention provide a method to clear a user's calendar for a particular time period, but not lose the lower priority tasks scheduled during the time period. In embodiments, a system is provided that enables a user to select a time period to reschedule a meeting that is naturally more flexible, such as events that have been established with a replay channel/URL before a live event. In embodiments, a system is provided to enable a user to select a check box to automatically move a flexible event to a first available time slot on an electronic calendar within a predetermined time range/time period.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
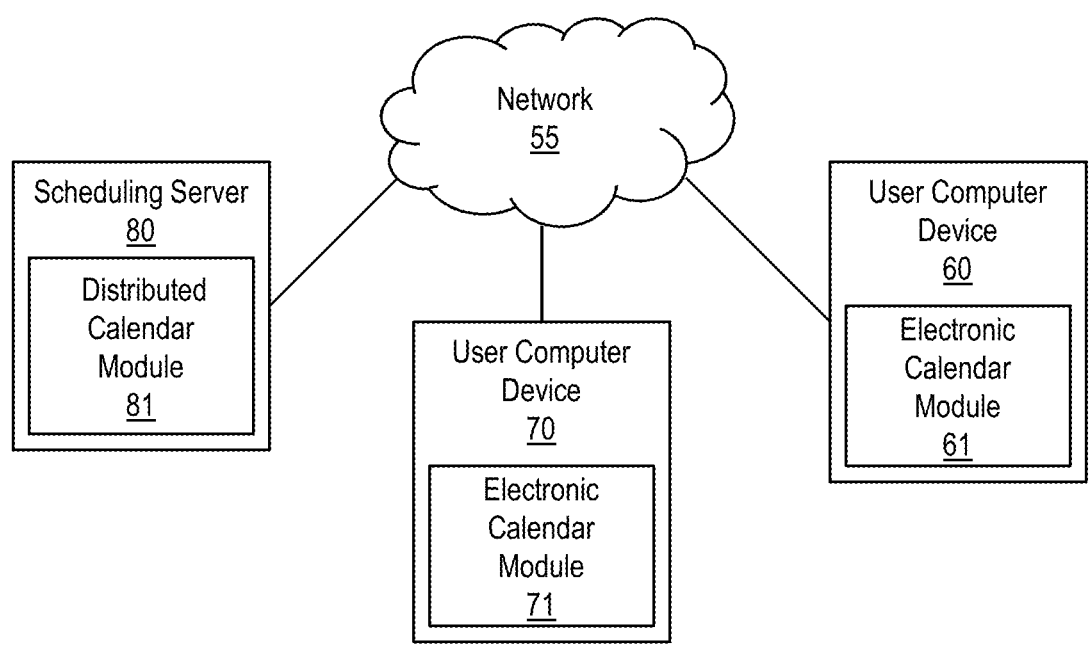
FIG. 2 shows an exemplary environment in accordance with aspects of the invention.

FIG. 2 shows an exemplary environment in accordance with aspects of the invention. The environment includes a plurality of user computer devices represented at 60 and 70 connected to a network 55. The user computer devices 60 and 70 may each comprise a computer system 12 of FIG. 1, and may each be connected to the network 55 via the network adapter 20 of FIG. 1. In aspects, the user computer devices 60 and 70 each have a respective electronic calendar module 61 and 71. The user computer devices 60 and 70 may include conventional electronic calendaring software, which may be separate from or incorporate in the respective electronic calendar modules 61, 71. In embodiments, the user computer devices 60 and 70 are general purpose computing devices, such as a desktop computer, laptop computer, tablet computer, smartphone, etc.

Still referring to FIG. 2, each of the electronic calendar modules 61 and 71 are configured to perform one or more of the functions described herein, and may include one or more program modules (e.g., program module 42 of FIG. 1) executed by the respective user computer devices 60, 70. In embodiments, each electronic calendar module 61, 71 is configured perform a variety of calendaring functions including one or more of: receiving scheduling data; recording scheduling data in an electronic calendar; identifying one or more events as flexible events; determining scheduling options for multiple electronic calendar; causing scheduling options and/or invitations to be displayed; and automatically rescheduling calendared events. Additional details regarding functions of calendar modules 61, 71 are discussed in more detail with respect to FIGS. 3 and 4.

The network 55 may be any suitable communication network or combination of networks, such as a local area network (LAN), a general wide area network (WAN), and/or a public network (e.g., the Internet). Electronic calendar modules 61 and 71 may communicate with one another via the network 55. Alternatively, a scheduling server 80 may manage communications between electronic calendar modules 61 and 71 of the respective user computer devices 60 and 70 via the network 55. The scheduling server 80 may comprise components of the computer system 12 of FIG. 1, and may be connected to the network 55 via the network adapter 20 of FIG. 1. The scheduling server 80 may be a general purpose computing device, such as a desktop computer, laptop computer, tablet computer, smartphone, etc. Alternatively, the scheduling server 80 may be configured as a special purpose computing device that is part of a network-based calendaring infrastructure. For example, the scheduling server 80 may be configured to provide cloud-based electronic calendaring services to a plurality of user computer devices 60, 70 through the network 55.

In embodiments, the scheduling server 80 includes a distributed calendar module 81 configured to perform one or more of the functions described herein. The distributed calendar module 81 may include one or more program modules (e.g., program module 42 of FIG. 1) executed by the scheduling server 80, and may be configured to perform a variety of calendaring functions including one or more of: receiving scheduling data; recording scheduling data; determining scheduling options of multiple calendar users; causing scheduling options and/or invitations to be displayed; communicating scheduling data and/or electronic calendar data between one or more user computer devices (e.g., 60 and 70); and automatically rescheduling calendared events manage communications between electronic calendar modules (e.g., 61 and 71).

Figure 3:
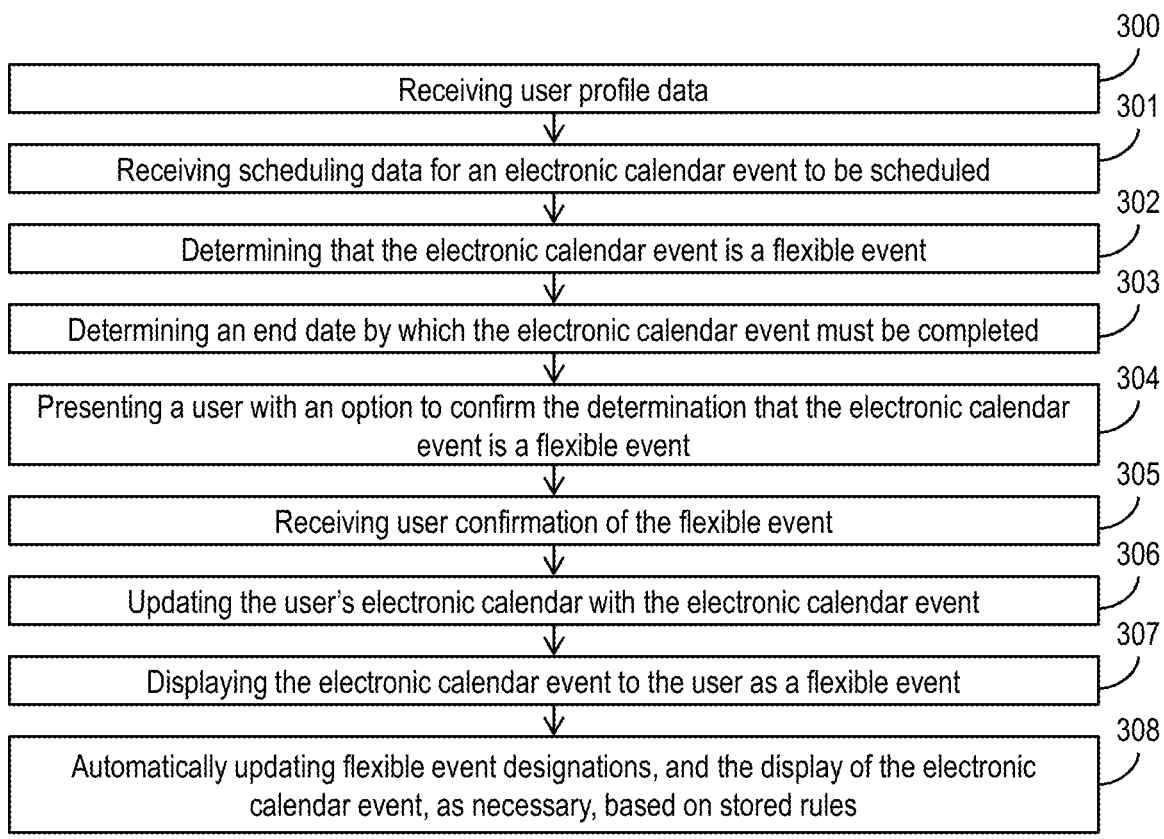
FIG. 3 shows a flowchart of steps of a method in accordance with aspects of the invention.

FIG. 3 shows a flowchart of a method for scheduling a flexible event in accordance with aspects of the invention. Steps of the method of FIG. 3 may be performed in the environment illustrated in FIG. 2, and are described with reference to elements shown in FIG. 2.

At step 300, a user computer device 60 receives user profile data for an electronic calendar system. In embodiments, the user computer device 60 may present a user with options to configure rules of the electronic calendar module 61. For example, a user may enter parameters for moving a flexible event within the user's electronic calendar, such as the number of hours a flexible event may be moved, or how far into the future a flexible event may be moved. In aspects, the user computer device 60 receives parameters from a user designating how a flexible event should be presented to others viewing the flexible event (e.g., an administrator scheduling group events across multiple electronic calendars). As used herein the term flexible event means an event that can be automatically moved from a first schedule location on an electronic calendar to a second (e.g., future) open schedule location on the electronic calendar within time constraints associated with the flexible event. In embodiments, the electronic calendar module 61 enables a user to set limits on the number of total meetings or flexible meetings that can be moved within a given timeframe. In aspects, a graphical user interface of the user computer device 60 may enable a user to override any rules or parameters stored with the user profile data.

At step 301, a user computer device 60 receives scheduling data for a calendar event to be scheduled. In aspects, the scheduling data may be entered into the user computer device 60 by the user of the electronic calendar. In embodiments, the user computer device 60 receives the scheduling data from another user computer device 70 through the network 55. In an alternative embodiment, the user computer device 60 receives the scheduling data from the scheduling server 80 via the network 55. In aspects, the electronic calendar module 61 of the user computer device 60 receives the scheduling data from one of the scheduling server 80 and another user computer device 70 via the network 55. In embodiments, the scheduling data includes recording data indicating that a recording of the electronic calendar event may be available. Recording data may include, for example: an established replay channel/URL; metadata such as "meeting recording availability"; or keywords demonstrating flexibility of an event such as "recorded", "self paced study", etc.

At step 302, the user computer device 60 determines that the electronic calendar event is a flexible event. In aspects, the electronic calendar module 61 determines the calendar event is a flexible event based on one of the following: received scheduling data indicating that the event is flexible; scheduling data added by a user of the calendar indicating that the event is flexible (e.g., event is tagged by the user as flexible); electronic calendar module 61 automatically detecting that the event is flexible based on keyword recognition (e.g., user profile setting includes rules designating certain keywords as indicating a flexible event); or electronic calendar module 61 automatically detecting that the event is associated with a recording based on recording data. In embodiments, a user may tag an electronic calendar event as a flexible event when accepting the electronic calendar event (e.g., accepting an invitation to schedule the electronic calendar event) or when editing the electronic calendar event in the user's electronic calendar. In this case, the user computer device 60 would determine that the electronic calendar event is a flexible event based on the user's tag.

In aspects, the flexible event is an event associated with recorded data or recorded replays (e.g., a digital video) to be viewed by a user during the event, wherein the pre-recorded data may be viewed by the user within a predetermined time frame (e.g., by a viewing deadline). In embodiments, the user computer device 60 analyzes the scheduling data to determine that the event to be scheduled is associated with recorded data, and is therefore considered a flexible event. For example, the electronic calendar module 61 may utilize natural language processing to recognize keywords (e.g., recorded, self paced study, etc.) in the scheduling data that indicate that pre-recorded data is available for the electronic calendar event at issue. In embodiments, the electronic calendar module 61 determines that the electronic calendar event is a flexible event by determining that metadata in the scheduling data indicates that a recording or possible recording of the electronic calendar event is available. For example, the electronic calendar module 61 may recognize that the metadata includes "meeting recording availability" data.

At step 303, the user computer device 60 determines an end date by which the electronic calendar event (flexible event) from step 302 must be completed. For example, the electronic calendar module 61 may determine that metadata in the scheduling data indicates a "meeting recording availability through May 7, 2017", and determines that the end date by which the electronic calendar event must be completed is May 7, 2017. In embodiments, a user may edit the electronic calendar event in the user's electronic calendar to indicate an end date. In this case, the user computer device 60 would determine the end date based on the user's edits to the electronic calendar event. Step 303 may be performed simultaneously with step 302, such as when metadata in the scheduling data indicates that the electronic calendar event is associated with a recording that has an associated "view by" date (e.g., view by May 7, 2017).

Optionally, at step 304, the user computer device 60 presents a user with an option to confirm that the electronic calendar event is a flexible event (i.e., requests confirmation of a flexible event designation). In aspects, the option to confirm includes an indication of the end date of the flexible event, determined at step 301. In embodiments, the electronic calendar module 71 prompts a user for confirmation that the event is a flexible event. In embodiments, the electronic calendar module 71 also prompts the user for a timeline within which the event must be completed (e.g., deadline for completion), if any. In this embodiment, step 303 is completed after the user computer device receives the timeline information from the user. Alternatively, the electronic calendar module may automatically recognize the end date by which the event must be completed (deadline) at step 303, and may present the end date to a user when prompting the user to confirm that the event is a flexible event at step 304.

At step 305, the user computer device 60 receives confirmation that the electronic calendar event is a flexible event, based on the option to confirm presented to the user at step 304. In embodiments, the user computer device 60 also receives confirmation of the end date determined at step 303. In aspects, the electronic calendar module 61 receives the user confirmation. In alternative embodiments, once the user computer device 60 receives the confirmation from the user that the electronic calendar event is a flexible event, the user computer device 60 prompts the user to enter a deadline by which the flexible event must take place in accordance with step 303.

At step 306, the user computer device 60 updates the electronic calendar of the user with the electronic calendar event (flexible event) and associated end date information (deadline, completion date, etc.). In embodiments, the electronic calendar module 71 recognizes receipt of the confirmation from step 305, and records the event in the user's electronic calendar as a flexible event. In aspects, electronic calendar event includes indicia indicating that the electronic calendar event is a flexible event, such as a color designation, an icon, a symbol, a border, or other visual representation of the flexible event designation. In embodiments, the electronic calendar event includes indicia indicating the end date by which the electronic calendar event must be completed.

At step 307, the user computer device 60 displays the electronic calendar event to a user as a flexible event. In embodiments, indicia (color designation, an icon, or other visual indicator) associated with the displayed electronic calendar event indicates that the electronic calendar event is a flexible event. In embodiments, the user computer device 60 displays the end date determined at step 303 as part of the display of the electronic calendar event.

At step 308, the user computer device 60 automatically updates the flexible event designation of the electronic calendar event and the display of the electronic calendar event, as necessary, based on stored rules. In embodiments, the user computer device 60 automatically removes a flexible event designation if the electronic calendar module 61 determines that the electronic calendar event can no longer be moved from the current schedule location to a future open schedule location, such as when no future open schedule location exists before the end date. For example, if a stored rule indicates that an electronic calendar event can no longer be designated as a flexible event if there are no calendar openings between its current location on an electronic calendar and the end date, and the user computer device 60 determines that no future open schedule locations are available before the end date, then the user computer device 60 automatically updates the electronic calendar event to indicate that it is a non-movable or non-flexible event, removes any indicia indicating that the electronic calendar event is a flexible event, and automatically presents an updated depiction of the electronic calendar event in an electronic calendar interface. It should be understood that steps 300-308 may be broken into more or less steps than those illustrated in FIG. 3. For example, steps may be combined and performed simultaneously by the user computer device 60.

Example 1: Marking a Meeting as Flexible

An example of scheduling a flexible event in accordance with embodiments of the invention is described with reference to FIG. 3. In a first example, a user opens a calendar invitation for an upcoming meeting received in accordance with step 301 of FIG. 3. The invitation in this scenario includes a link to a location where a recording of the meeting is posted or will be posted. The user computer device 60 detects that the meeting may be a flexible event due to the inclusion of the link in accordance with step 302 of FIG. 3, and prompts the user to confirm that the meeting should be designated as a flexible event in accordance with step 304 of FIG. 3. Upon receipt of confirmation by the user that the meeting should be designated as a flexible event in accordance with step 305 of FIG. 3, the user computer device 60 prompts the user to enter a deadline by which the flexible event must take place in accordance with step 303 of FIG. 3. Upon receipt of the deadline from the user, the user computer device 60 then updates the user's electronic calendar with the flexible event, in accordance with step 306, and displays the electronic calendar event as a flexible event to the user in accordance with step 307.

Figure 4:
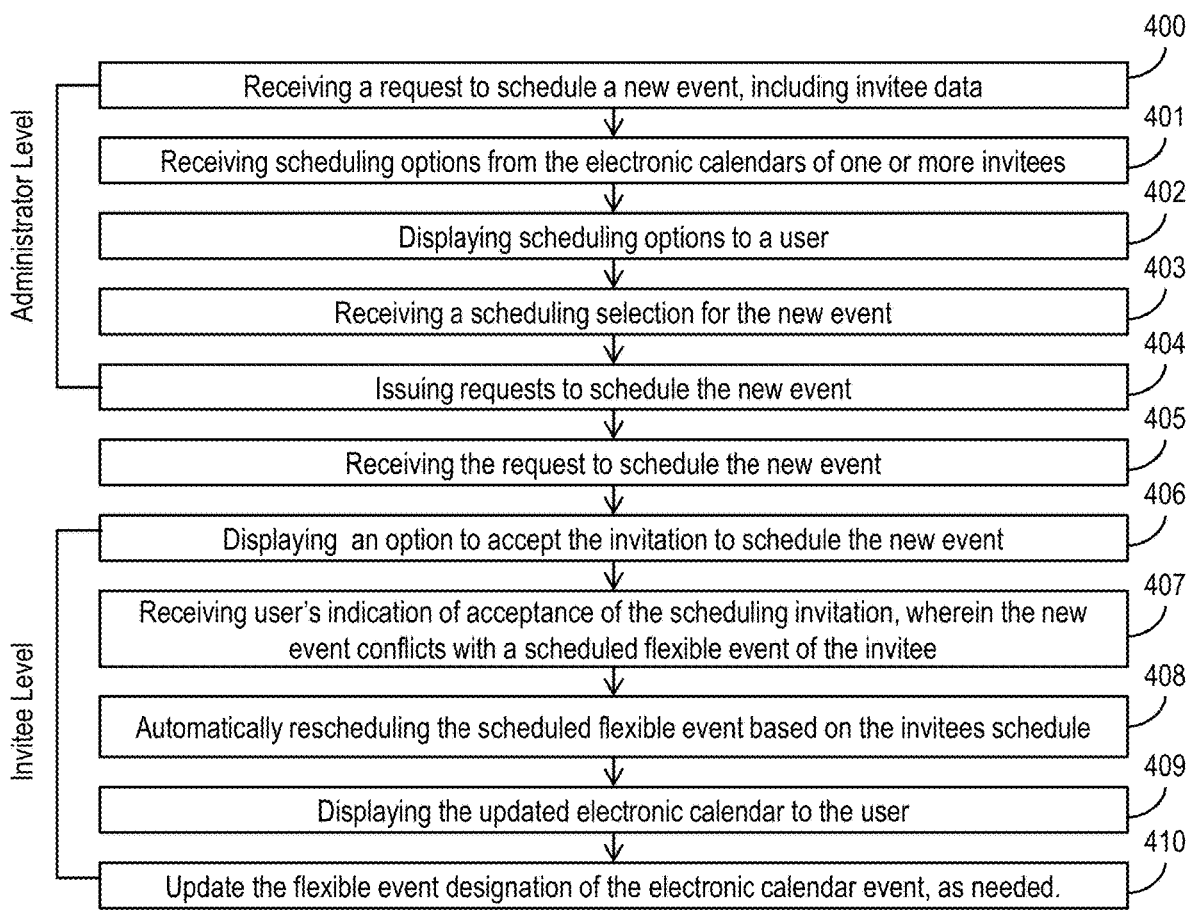
FIG. 4 shows a flowchart of steps of a method in accordance with aspects of the invention.

FIG. 4 shows a flowchart of a method for scheduling a new event in conflict with a flexible event in accordance with aspects of the invention. Steps of the method of FIG. 4 may be performed in the environment illustrated in FIG. 2, and are described with reference to elements shown in FIG. 2.

At step 400, a user computer device 70 receives a request to schedule a new event, including invitee data. The term new event as used herein may include a new event to be entered into one or more electronic calendars of invitees, or a pre-existing calendar event that is being rescheduled or moved within the one or more electronic calendars of the invitees. By way of example, an administrator at the user computer device 70 may enter a list of users (invitees) to be invited to the new event and a date range for the event into the user computer device 70. In aspects, the request to schedule a new event may comprise a user clicking on a date within their electronic calendar, wherein the invitee data includes only the user themselves.

At step 401, the user computer device 70 receives scheduling options from the electronic calendars of one or more invitees. For example, the user computer device 70 may receive copies of portions of the electronic calendars of one or more invitees (e.g., interface showing weekly calendars of the one or more invitees, with scheduling events and open schedule locations). The scheduling options are not limited to any particular calendar data configuration, and may include any data configuration that enables an administrator or user to determine availability of one or more invitees for scheduling purposes. In embodiments, the electronic calendar module 71 may retrieve scheduling options from the scheduling server 80 via the network 55. In aspects, the scheduling options are in the form of an electronic calendar interface for a sole user of the user computer device 70, wherein the user computer device 70 receives scheduling options in the form of the user's electronic calendar interface (e.g., interface showing weekly calendar of user with scheduled events and open schedule locations).

At step 402, the user computer device 70 displays the scheduling options to a user, such as through a user display 24 of FIG. 1. In embodiments, the electronic calendar module 71 causes scheduling options received at step 401 to be displayed to a user through the user computer device 70. In aspects, one or more electronic calendar events in respective electronic calendars of multiple invitees are displayed to a user of the user computer device 70 with indicia identifying any flexible events. In embodiments, scheduling options may be presented to a user in a tiered approach. For example, a first set of scheduling options may include only open positions on the electronic calendars of invitees, and a second set of scheduling options may include both open positions on the electronic calendars and scheduled flexible events on the electronic calendars. In aspects, a user may select to view either the first set of scheduling options or the second set of scheduling options, or the user computer device 70 may automatically display one of the first or second sets of scheduling options based on stored rules. In aspects, the scheduling options displayed in the form of an electronic calendar interface for a sole user of the user computer device 70.

At step 403, the user computer device 70 receives a scheduling selection for a new event to be scheduled in the electronic calendars of one or more of the invitees. In embodiments, the electronic calendar module 71 recognizes that a user has entered a scheduling selection into a user interface of the user computer device 70. For example, the electronic calendar module 71 may determine that an administrator has selected a meeting date of May 6, 2017 between 10:30 AM and 1:30 PM for one or more invitees.

At step 404, the user computer device 70 issues one or more requests to schedule the new event. In embodiments, the electronic calendar module 71 sends the requests to one or more user computer device (e.g., 60) through the scheduling server 80 via the network 55. In alternative embodiments, the electronic calendar module 71 sends the requests directly to one or more user computer device (e.g., 60) via the network 55.

At step 405, the user computer device 60 receives the request to schedule the new event issued by the user computer device 70 at step 311. In embodiments, the user computer device 60 receives the request from the scheduling server 80 via the network 55. In alternative embodiments, the user computer device 60 receives the request directly from the user computer device 70 via the network 55.

Optionally, at step 406, the user computer device 60 displays an option to accept the invitation to schedule the new event. For example, the user computer device 60 may display the invitation to a user of the user computer device 60 through an email invitation or the like. Alternatively, the electronic calendar module 61 of the user computer device 60 may be configured to automatically accept a request to schedule the new event.

Optionally, at step 407, the user computer device 60 receives acceptance of the invitation to schedule the new event. For example, the user computer device 60 may determine that a user has clicked on an "accept" button or on a link to accept the invitations to schedule the new event, even though the new event conflicts with the electronic calendar event (flexible event) previously scheduled at step 306 of FIG. 3. Alternatively, the electronic calendar module 61 of the user computer device 60 may be configured to automatically update a user's electronic calendar with calendar date received from the user computer device 70.

At step 408, the user computer device 60 automatically reschedules the previously recorded electronic calendar event (flexible event), when the electronic calendar event conflicts with the new event. In embodiment, the electronic calendar module 61 determines that the new event conflicts with the electronic calendar event (e.g., the new event overlaps in time with at least a portion of the electronic calendar event) and automatically reschedules the electronic calendar event by moving the electronic calendar event from a first location to an open second location on the electronic calendar, wherein the open second location is a location prior to the end date (deadline) determined at step 303 of FIG. 3. In embodiments, step 408 is based on user profile data stored in the user computer device 60. In aspects, the user computer device 60 only automatically reschedules the previously recorded electronic calendar event when the electronic calendar event conflicts with the new event and parameters (rules) regarding movement of flexible events are met. For example, the user computer device 60 may determine that a flexible event may not be automatically moved when rules in the user profile data indicate that the maximum number of flexible event reschedulings has already occurred.

At step 409, the user computer device 60 displays the updated electronic calendar to the user. In embodiments, the electronic calendar module 61 causes the electronic calendar display to be updated such that the user views the changes to the electronic calendar imparted by the automatic rescheduling in step 408.

At step 410, the user computer device 60 automatically updates the flexible event designation of the electronic calendar event, as needed. In embodiments, the electronic calendar module 61 determines that the no open locations remain on the electronic calendar between the second location and the end date associated with the electronic calendar event, and updates the electronic calendar to indicate that the electronic calendar event is no longer a flexible event (e.g., removes indicia indicating the electronic calendar event is a flexible event and records the electronic calendar event as a non-flexible event).

Example 2: Scheduling a New Event in Multiple Calendars

In another use scenario, an administrator wishes to schedule a meeting with several invitees (parties). The administrator enters a request into a user interface of the user computer device 70 for scheduling options for the invitees, in accordance with step 400 of FIG. 4. Scheduling options in the form of open locations on respective electronic calendars for the invitees are then presented to the user through a display (e.g., the 24 of FIG. 1) of the user computer device 70 in accordance with step 401 of FIG. 4. The administrator determines that no scheduling options work for all of the invitees, and adjusts the scheduling options to display flexible events as well as open locations on the respective electronic calendars. The user computer device 70 then displays scheduling options to the administrator, including open locations (open calendar locations) and any flexible events in the invitees' electronic calendars. The administrator can distinguish the flexible events from non-flexible events based on indicia presented with the displayed scheduling options.

Example 2: Schedule a New Event in One Calendar

It should be understood that steps 400-409 may be performed in the context of a sole user being both the administrator and an invitee. For example, a user computer device 60 may receive a request to schedule a new event (step 400) in the form of a user opening their calendar and entering new event data into the electronic calendar, wherein the new event conflicts with a scheduled flexible event. In this scenario, the step of receiving scheduling options (step 401) may be in the form of the electronic calendar module 61 retrieving scheduling options from a database and then presenting an electronic calendar interface to a user in accordance with step 402. The step of receiving a schedule selection for the new event (step 403) may comprise the user entering the calendar data at step 400, wherein the user computer device 60 may issue a request to the electronic calendar module 61 to schedule the new event (step 404), the electronic calendar module 61 may receive the request (step 405), and the electronic calendar module 61 may automatically reschedule the flexible event based on the user's schedule (step 408).

Example 4: Accepting a New Event in Place of a Flexible Event

Figure 5:
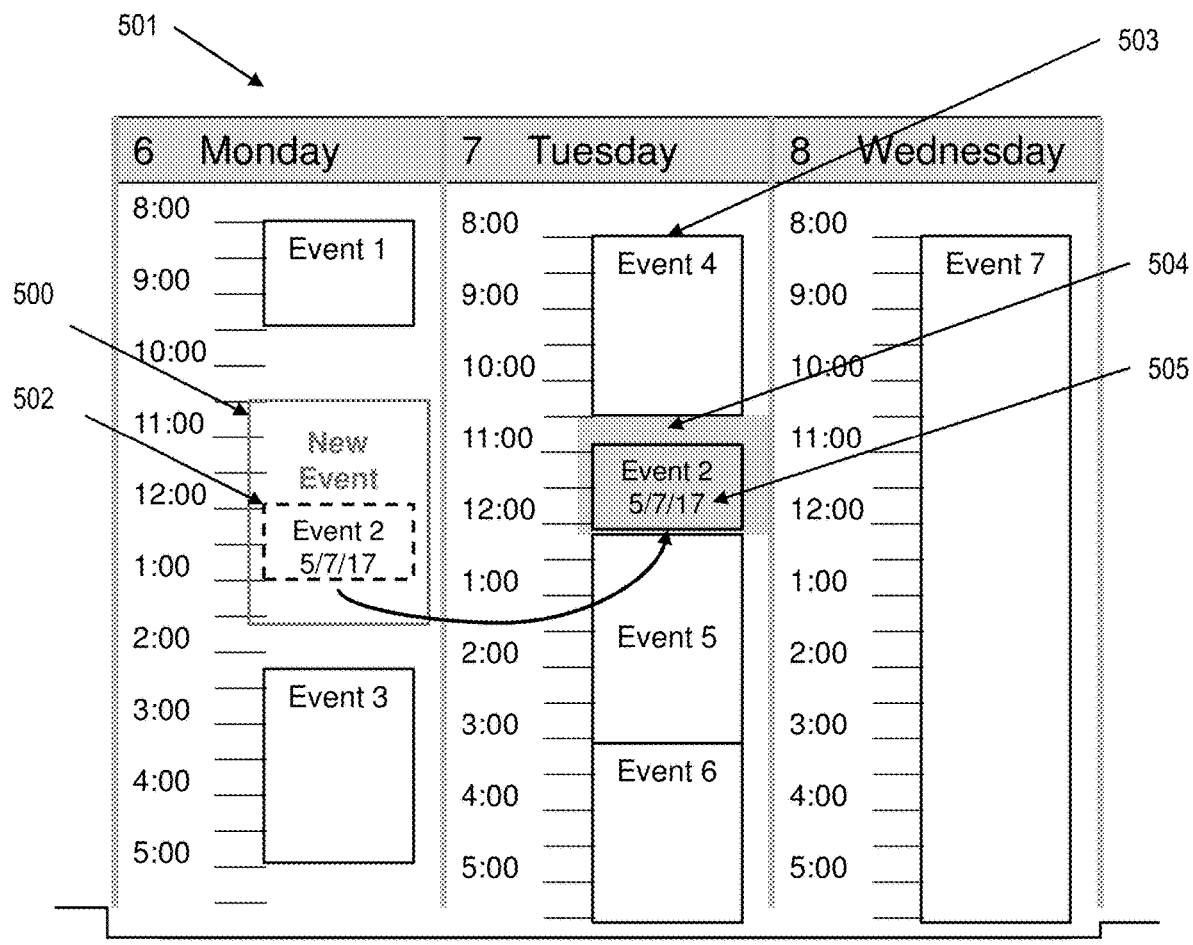
FIG. 5 illustrates a use scenario in accordance with embodiments of the present invention.

FIG. 5 illustrates a use scenario in accordance with embodiments of the present invention. Steps illustrated FIG. 5 may be performed in the environment illustrated in FIG. 2, and may include steps illustrated in the flowchart of FIG. 4.

In the use scenario illustrated in FIG. 5, the user computer device (e.g., 60) of an invitee receives a request or invitation (not shown) to schedule a new event 500 in their electronic calendar 501, in accordance with step 405 of FIG. 4. As illustrated in FIG. 5, the new event 500 overlaps in time with an electronic calendar event 502 (Event 2) scheduled between 12:00 and 1:00 on Monday the $6^{th}$. Dashed lines (indicia) indicate to a viewer that the electronic calendar event 502 is a flexible event, while solid lines indicate that other calendar events 503 are non-flexible events (Events 1, and 3-7). The user computer device 60 displays the option to accept the scheduling of the new event 500 to the user in the form of an email notification (not shown), along with a warning that the new event 500 conflicts with the scheduled event 502 (Event 2), in accordance with step 406 of FIG. 4. The invitee chooses to accept the invitation by clicking on a link in the email notification (not shown), and the user computer device 60 recognizes receipt of this acceptance in accordance with step 407 of FIG. 4.

Referring to FIG. 5, the user computer device 60 automatically reschedules the electronic calendar event 502 from a first position on the electronic calendar 501, to an open second location represented by the shaded portion 504 of the electronic calendar 501, in accordance with step 408 of FIG. 4. The user computer device 60 recognizes that the electronic calendar event 502 has an end date of May 7, 2017, and determines that no open positions are available between the second location 504 and the end date of May 7, 2017. Based on this determination, the user computer device 60 updates the designation of the electronic calendar event 502 from a flexible event to a non-flexible event, in accordance with step 409 of FIG. 4. As illustrated, the manner in which the electronic calendar event 502 is displayed to the user is also updated at step 409 of FIG. 4 based on updating the designation in accordance with step 410 of FIG. 4, such that the newly rescheduled electronic calendar event 502 is displayed with a solid border line, indicating that it is a non-flexible event.

Advantageously, embodiments of the present invention provide improvements to electronic calendaring systems by enabling an administrator to schedule or reschedule a new electronic calendar event with multiple invitees, each utilizing a different user computer device (e.g., 60, 70), by providing automatic rescheduling of conflicting flexible events in the electronic calendars of each of the multiple invitees. Aspects of the invention thus eliminate the need for the multiple invitees (often at remote locations) to participate in the rescheduling of a conflicting flexible event in their respective electronic calendars. Moreover, aspects of the invention provide for automatic detection of a flexible calendar event by a user's computer device utilizing metadata or other scheduling data provided by another user computer device. Further, embodiments of the invention cause a user computer device to automatically update the manner in which it displays an electronic calendar event to a user, to impart additional information to the user regarding the flexible or non-flexible nature of the electronic calendar event.

In embodiments, a service provider could offer to perform the processes described herein. In this case, the service provider can create, maintain, deploy, support, etc., the computer infrastructure that performs the process steps of the invention for one or more customers. These customers may be, for example, any business that uses electronic calendaring systems. In return, the service provider can receive payment from the customer(s) under a subscription and/or fee agreement and/or the service provider can receive payment from the sale of advertising content to one or more third parties.

In still another embodiment, the invention provides a computer-implemented method for managing flexible events in an electronic calendar. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   accessing, by a computing device, stored rules of a remote computer device of a user, wherein the rules define automatic scheduling options for a flexible event type calendar event including user-set limits on a number of total meetings that can be moved within a given timeframe, and keywords of a user profile of the remote user that indicate a flexible event;
   receiving, by an electronic calendar module of the computing device, a request to schedule a new event from an electronic calendar module of the remote computer device of the user over a network in response to the remote user entering the new event in a user interface of the remote computer device of the user, the request including scheduling data, wherein the new event overlaps with an electronic calendar event on an electronic calendar;

automatically determining, by the computing device using natural language processing, that the new event is a flexible event type calendar event based on recognizing the presence of one or more of the keywords in the received scheduling data that indicate a flexible event and indicate prerecorded event data is available;

automatically determining, by the computing device, a deadline for the new event based on metadata in the received scheduling data;

automatically presenting, by the computing device over the network, the remote user with an option to confirm that the new event is a flexible event type calendar event and confirm the determined deadline for the new event via the user interface of the remote computer device of the user;

receiving, by the computing device over the network, confirmation from the remote user that new event is a flexible event type calendar event and confirmation of the determined deadline for the new event;

automatically rescheduling, by the computing device, the new event based on the deadline of the new event and the new event being a flexible event type calendar event, wherein the new event is automatically moved from a first location on the electronic calendar to an open second location on the electronic calendar based on the rules of the remote user; and automatically displaying, by a user interface of the computing device, the rescheduled new event at the second location in the electronic calendar with indicia indicating the deadline for the new event and indicia indicating that the new event is a flexible event type calendar event.

2. The computer-implemented method of claim 1, wherein the deadline for the new event is a viewing deadline for viewing the prerecorded event data.

3. The computer-implemented method of claim 1, further comprising:

determining, by the computing device, that the new event at the second location is no longer a flexible event type calendar event based on the deadline of the new event; and updating, by the computing device, the displaying of the new event to remove the indicia indicating the new event is a flexible event type calendar event in the electronic calendar based on the rules.

4. The computer-implemented method of claim 3, wherein the determining that the new event at the second location is no longer a flexible event type calendar event comprises determining that no open locations are available on the electronic calendar prior to the deadline of the new event.

5. The computer-implemented method of claim 1, further comprising:

displaying, by the computing device, an indication that the new event overlaps with the electronic calendar event; and receiving, by the computing device, a user acceptance of the request to schedule the new event.

6. The computer-implemented method of claim 1, further comprising:

receiving, by the computing device, a request to schedule another calendar event including invitee data;

displaying, by the computing device, a plurality of electronic calendar events from respective electronic calendars of multiple invitees with indicia identifying flexible events in the respective electronic calendars;

presenting, by the computing device, scheduling options to the user based on the request to schedule the other calendar event, wherein the options are displayed as a first set of scheduling options including only open calendar positions on the respective electronic calendars, and as a second set of scheduling options including both open calendar positions on the respective electronic calendars and flexible events on the respective electronic calendars; and receiving, by the computing device, a selection of one of the scheduling options.

7. A computer program product comprising a computer readable storage medium having program instructions embodied therewith, the program instructions executable by a computing device to cause the computing device to:

access stored rules of a remote computer device of a user, wherein the rules define automatic scheduling options for a flexible event type calendar event including user-set limits on a number of total meetings that can be moved within a given timeframe, and keywords of a user profile of the remote user that indicate a flexible event;

receive, by an electronic calendar module of the computing device, a request to schedule a new event from an electronic calendar module of the remote computer device of the user over a network in response to the remote user entering the new event in a user interface of the remote computer device of the user, the request including scheduling data, wherein the new event overlaps with the electronic calendar event on an electronic calendar;

automatically determine, using natural language processing, that the new event is a flexible event type calendar event based on recognizing the presence of one or more of the keywords in the received scheduling data that indicate a flexible event and indicate pre-recorded data is available;

automatically determine a deadline for the new event based on metadata in the received scheduling data;

automatically present, over the network, the remote user with an option to confirm that the new event is a flexible event and confirm the determined deadline for the new event via the user interface of the remote computer device of the user;

receive, over the network, confirmation from the remote user that the new event is a flexible type calendar event and confirmation of the determined deadline for the new event;

automatically reschedule the new event based on the deadline of the new event and the new event being a flexible event type calendar event, wherein the new event is automatically moved from a first location on the electronic calendar to an open second location on the electronic calendar based on the rules of the remote user; and automatically display, by the user interface of the computing device, the rescheduled new event at the second location in the electronic calendar with indicia indicating the deadline for the new event and indicia indicating that the new event is a flexible event type calendar event.

8. The computer program product of claim 7, wherein deadline for the new event is a viewing deadline for the pre-recorded data.

9. The computer program product of claim 7, wherein the program instructions further cause the computing device to:
determine that the new event at the second location is no longer a flexible event type calendar event based on the determined deadline of the new event; and
updating the new event as a non-flexible event type calendar event based on the rules.

10. The computer program product of claim 9, wherein the determining that the new event at the second location is no longer a flexible event type calendar event comprises determining that no open locations are available on the electronic calendar prior to the deadline of the new event.

11. The computer program product of claim 7, wherein the program instructions further cause the computing device to:
display an indication that the new event overlaps with the electronic calendar event; and
receive a user acceptance of the request to schedule the new event.

12. The computer program product of claim 7, wherein the indicia indicating that the new event is a flexible event is selected from the group consisting of: a color designation; an icon; a symbol; a border; and other visual representation of the flexible event type calendar event designation.

13. The computer program product of claim 7, wherein the program instructions further cause the computing device to:
receive a request to schedule another calendar event including invitee data;
display a plurality of electronic calendar events from respective electronic calendars of multiple invitees with indicia identifying flexible events in the respective electronic calendars;
present scheduling options to the user based on the request to schedule the other calendar event, wherein the options are displayed as a first set of scheduling options including only open calendar positions on the respective electronic calendars, and as a second set of scheduling options including both open calendar positions on the respective electronic calendars and flexible events on the respective electronic calendars; and
receive a selection of one of the scheduling options.

14. The computer program product of claim 7, wherein the program instructions further cause the computing device to:
reschedule the new event by moving the new event from the second location in the electronic calendar to a third location in the electronic calendar;
determine that the new event at the third location is no longer a flexible event type calendar event based on the deadline of the new event; and
automatically update the displaying of the new event by the user interface to remove the indicia indicating the new event is a flexible event.

15. A system comprising:
a CPU, a computer readable memory and a computer readable storage medium associated with a computing device;
program instructions to access stored rules of a remote computer device of a user, wherein the rules define automatic scheduling options for a flexible event type calendar event including user-set limits on a number of total meetings that can be moved within a given timeframe, and keywords of a user profile of the remote user that indicate a flexible event;
program instructions to receive, by an electronic calendar module of the computing device, a request to schedule a new event from an electronic calendar module of the remote computer device of the user over a network in response to the remote user entering the new event in a user interface of the remote computer device of the user, the request including scheduling data, wherein the new event overlaps with an electronic calendar event on an electronic calendar;
program instructions to automatically determine, using natural language processing, that the new event is a flexible event type calendar event based on recognizing the presence of one or more of the keywords in the received scheduling data that indicate a flexible event and indicate prerecorded event data is available;
program instructions to automatically determine a deadline for the new event based on metadata in the received scheduling data;
program instructions to automatically present, over the network, the remote user with an option to confirm that the new event is a flexible event type calendar event and confirm the determined deadline for the new event via the user interface of the remote computer device of the user;
program instructions to receive, over the network, confirmation from the remote user that the new event is a flexible event type calendar event and confirmation of the determined deadline for the new event;
program instructions to automatically reschedule the new event based on the new event being a flexible event type calendar event, wherein the new event is automatically moved from a first location on the electronic calendar to an open second location on the electronic calendar based on the rules of the remote user; and
program instructions to automatically display, by a user interface of the computing device, the rescheduled new event at the second location in the electronic calendar with indicia indicating the deadline for the new event and indicia indicating that the new event is a flexible event type calendar event,
wherein the program instructions are stored on the computer readable storage medium for execution by the CPU via the computer readable memory.

16. The system of claim 15, further comprising:
program instructions to determine that the new event at the second location is no longer a flexible event type calendar event based on the determined deadline; and
program instructions to display the electronic calendar as a non-flexible event type calendar event.

17. The system of claim 16, wherein the determining that the new event at the second location is no longer a flexible event type calendar event comprises determining that no open locations are available on the electronic calendar prior to the deadline of the new event.

18. The system of claim 15, further comprising:
program instructions to display an indication that the new event overlaps with the electronic calendar event; and
program instructions to receive a user acceptance of the request to schedule the new event.

19. The system of claim 15, wherein the indicia indicating that the new event is a flexible event is selected from the group consisting of: a color designation; an icon; a symbol; a border; and other visual representation of the flexible event type calendar event designation.

* * * * *